United States Patent

[11] 3,586,975

| [72] | Inventor | L. V. Colvson |
| | | Philadelphia, Pa. |
| [21] | Appl. No. | 820,604 |
| [22] | Filed | Apr. 30, 1969 |
| [45] | Patented | June 22, 1971 |
| [73] | Assignee | Burroughs Corporation |
| | | Detroit, Mich. |

[54] A VOLTAGE MONITORING CIRCUIT FOR SIMULTANEOUSLY DETECTING EXCESSIVE EXCURSIONS OF A PLURALITY OF PRIMARY VOLTAGE SOURCE
10 Claims, 1 Drawing Fig.

[52] U.S. Cl.................................................. 324/133,
307/235, 324/140, 340/248
[51] Int. Cl.............................................. G01r 19/16
[50] Field of Search........................................ 324/51,
133, 140; 340/248

[56] References Cited
UNITED STATES PATENTS

| 2,762,978 | 9/1956 | Norton | 324/140 |
| 2,763,838 | 9/1956 | McConnell | 324/140 |
| 2,993,172 | 7/1961 | Karlicek | 324/133 |
| 3,003,108 | 10/1961 | Thiele | 324/140 |
| 3,377,552 | 4/1968 | Baum | 324/51 |

*Primary Examiner*—Gerard R. Strecker
*Attorney*—Carl Fissell, Jr.

ABSTRACT: A signalling circuit is disclosed which is capable of monitoring primary voltages used in electronic circuitry. For example, in the present application the primary direct current voltages used in an electronic digital computer are monitored. The variation of any one of a plurality of these primary voltages above or below a predetermined value causes the creation of a status signal. Thus, maximum or minimum values are specified for each of the voltages and any excursion above or below these preset limits initiates an error output voltage. This over/under voltage detector is mechanized with balanced passive and active electrical bridge circuits connected in tandem. The design approach employs only essential components which will be somewhat the same number of components to build one of the circuits using the conventional approach wherein a separate circuit is used for each voltage to be monitored.

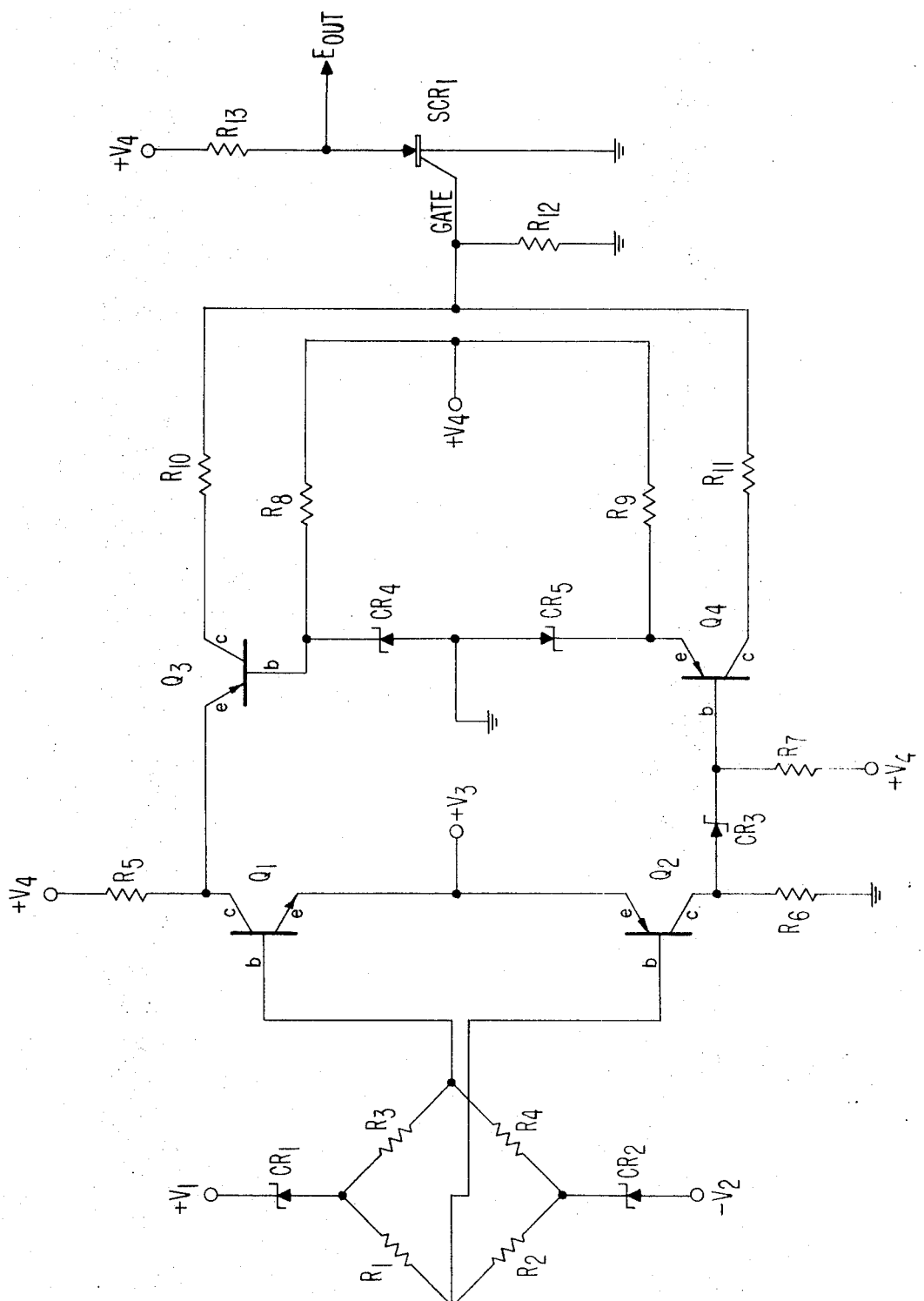

A VOLTAGE MONITORING CIRCUIT FOR SIMULTANEOUSLY DETECTING EXCESSIVE EXCURSIONS OF A PLURALITY OF PRIMARY VOLTAGE SOURCE

BACKGROUND OF THE INVENTION

1. Field of the Invention

The concept of providing overvoltage and/or undervoltage detection with different monitoring circuits is well known in the electronic engineering art. Generally, therefore, this invention relates to the monitoring of power supply output voltages and the provision to supply an output signal indicative of overvoltage and undervoltage excursions outside a predetermined range.

2. Description of the Prior Art

In the past, the conventional design of an over/under voltage detector was to design one circuit configuration for each voltage that required monitoring. This design approach, in most cases, required many costly and critical components to be duplicated for each power supply that was to be monitored. In addition, an excessive excursion by any one of the circuits meant that all power supplies had to be disabled. Since the other circuits were unaware of the excessive voltage shift, all of the several outputs had to be combined so as to initiate an overall power turn off, when any one of the supplies developed a malfunction.

BRIEF SUMMARY OF THE INVENTION

A signalling circuit is provided for indicating when any one of three independently monitored direct current voltages exceeds a predetermined maximum, or drops below a predetermined minimum value. The over/under voltage detector is mechanized on the principle of an electronic bridge circuit. The electronic bridge circuit is balanced when the monitored voltages are within a specified voltage range. When an excursion of any one of the voltages goes outside of this specified range, oppositely conducting NPN and PNP transistor amplifiers increase the change in voltage sufficiently to energize a signalling device. The signalling device, in this instance, is a silicon controlled rectifier (SCR).

If the anode of the SCR is connected to a positive voltage through a suitable resistor, the output signal from the SCR when energized, provides a voltage very near zero. Thus if a positive voltage is specified as a TRUE logic level, and a low or zero voltage a logical FALSE, a TRUE logic value will be present when each of the monitored voltages is within its predetermined voltage range and a FALSE logic value when any one of the voltages is outside its preset limits.

The SCR also can be used to control a relay, which, in turn, can control an auxiliary circuit to indicate the relative status of the monitored voltages.

It is therefore an object of this invention to provide a single over/under voltage monitoring circuit capable of simultaneously monitoring a plurality of voltages and providing an output signal when any one of the plurality goes outside a predetermined voltage range.

It is also an object of the present invention to provide a monitoring circuit which is capable of producing an abnormal voltage status signal in the absence of any one of the three monitored voltages.

It is still another object of this invention to provide a monitoring circuit which is capable of producing an abnormal voltage status signal independently of the relative values of each of the monitored voltages.

It is still another object of this invention to provide a monitoring circuit capable of independently initiating an overall power turn off without the need of previously combining the output voltages of several different circuits.

These and other objects will become more readily apparent upon consideration of the remainder of this specification together with the accompanying drawing.

BRIEF DESCRIPTION OF THE DRAWING

The FIGURE is a schematic circuit drawing of the preferred embodiment of the over/under voltage monitoring circuit.

DETAILED DESCRIPTION OF THE PREFERRED EMBODIMENT

A circuit schematic of a three input voltage detector is shown in the FIGURE. An auxiliary power supply voltage indicated as $V_4$ controls the monitoring circuit and the circuit output voltage. This auxiliary voltage is not critical and any value from +30 volts to +50 volts is satisfactory. Voltages $V_1$, $V_2$ and $V_3$ represent the three voltages to be monitored. Suggested voltage values for this discussion have been selected as $V_1$ (+15v), $V_2$(−15 v.) and $V_3$(+4 v.). For normal (within range) input voltages, transistors $Q_3$ and $Q_4$ are turned on (conducting) while transistors $Q_3$ and $Q_4$ are turned off (nonconducting). Thus, the PNPN Silicon Controlled Rectifier (SCR) is normally turned off and the circuit output voltage is determined by $V_4$.

The input bridge circuit $R_1$, $R_2$, $R_3$ and $R_4$ together with zener diodes $CR_1$ and $CR_2$ provides the proper voltage for transistors $Q_1$ and $Q_2$ to be in full conduction. In the present embodiment $CR_1$ and $CR_2$ are both 9 v. zener diodes. Thus, the nodal voltage at the junction of resistors $R_1$ and $R_3$ with diode $CR_1$ will be reduced from voltage $V_1$ by 9 volts. Likewise, the nodal voltage at the junction of resistors $R_2$ and $R_4$ with diode $CR_2$ will be increased from $V_2$ by 9 volts. Transistor $Q_1$ is turned on by selecting the values of resistors $R_3$ and $R_4$ so that the base voltage of $Q_1$ is sufficiently positive with respect to $V_3$ for $Q_1$ to be in full conduction. Transistor $Q_2$ is similarly turned on by selecting the values of resistors $R_1$ and $R_2$ so that the base voltage of $Q_2$ is sufficiently negative with respect to $V_3$ for $Q_2$ to be in full conduction.

When transistor $Q_1$ is turned on, the collector current of $Q_1$ flowing through $R_5$ drops the emitter voltage of $Q_3$ below the base voltage determined by the zener diode $CR_4$ and resistor $R_6$ to thereby turn off $Q_3$. When transistor $Q_2$ is turned on, the collector current of $Q_2$ flowing through resistor $R_6$ raises the voltage at the anode of zener diode $CR_3$.

This, in turn, provides (via diode $CR_3$) an increase in voltage on the base of transistor $Q_4$. This increase causes the voltage at the base to be positive with respect to the emitter voltage of $Q_4$. The emitter voltage, of course, is determined by the zener diode $CR_5$ and resistor $R_9$. When the base voltage of transistor $Q_4$ is positive with respect to the emitter voltage, the transistor $Q_4$ is turned off.

As noted previously, for normal input voltages $V_1$, $V_2$ and $V_3$, the transistors $Q_1$ and $Q_2$ are turned on, while transistors $Q_3$ and $Q_4$ and controlled rectifier $SCR_1$ are turned off. Thus the normal output voltage, $E_{out}$, of the detector circuit is determined by $+V_4$.

Now if any one of the three monitored voltages $V_1$, $V_2$ or $V_3$ varies beyond a predetermined value, transistor $Q_1$ or $Q_2$ will turn off, and either $Q_3$ or $Q_4$ will cause a positive voltage to be developed across resistor $R_{12}$ and applied to the gate of the controlled rectifier $ACR_1$. Resistors $R_{10}$, $R_{11}$ and $R_{12}$ are selected so that the magnitude of collector current through transistor $Q_3$ or $Q_4$ will sufficiently raise the voltage at the gate of $SCR_1$ to turn on the rectifier diode.

Consider next specific changes in the three input voltages $V_1$, $V_2$ or $V_3$.

First an increase in voltage $V_1$ will cause transistor $Q_2$ to conduct less until transistor $Q_4$ turns on. This, in turn, turns on the rectifier $SCR_1$ to provide an output voltage $E_{out}$ approximately at ground level. Next, consider the case where $V_1$ decreases. In this event, transistor $Q_1$ will conduct less and less until transistor $Q_3$ turns on. This also will cause the activation of rectifier $SCR_1$. In the case of an increase in voltage $V_2$, transistor $Q_1$ will decrease in conduction until transistor $Q_3$ is turned on, which will then activate $SCR_1$. Alternately, where voltage $V_2$ decreases, transistor $Q_2$ conducts less until transistor $Q_4$ turns on, at which time rectifier $SCR_1$ is activated.

Finally, where voltage $V_3$ increases, current through transistor $Q_1$ reduces until transistor $Q_3$ is switched on to, in turn, activate $SCR_1$.

A reduction in voltage $V_2$ causes a corresponding reduction in current through transistor $Q_2$ until transistor $Q_4$ is activated. This activation causes rectifier $SCR_1$ to conduct.

Thus it is seen that the rectifier $SCR_1$ is activated in each of six different conditions of the three input voltages to enable overvoltage and under voltage detection for each of the plurality of input voltages using a single circuit to accomplish the detection.

The following is a suggested list of component values and types. It is, of course, realized that the values and types given are considered to denote a specific preferred embodiment and certainly the invention can be practiced with other transistor types, element values and voltage magnitudes to give corresponding operation.

$Q_1 = 2N2222$
$Q_2 = 2N2707$
$Q_3 = 2N2907$
$Q_4 = 2N2907$
$SCR_1 = 2N2323$
$R_1 = 1.2K\ \Omega$
$R_2 = 4.8K\ \Omega$
$R_3 = 750\ \Omega$
$R_4 = 6.5K\ \Omega$
$R_5 = 12K\ \Omega$
$R_6 = 200\ \Omega$
$R_7 = 12K\ \Omega$
$R_8 = 12K\ \Omega$
$R_9 = 12K\ \Omega$
$R_{10} = 1K\ \Omega$
$R_{11} = 1K\ \Omega$
$R_{12} = 1K\ \Omega$
$CR_1 = 9v.$ (Zener)
$CR_2 = 9v.$ (Zener)
$CR_3 = 6v.$ (Zener)
$CR_4 = 6v.$ (Zener)
$CR_5 = 6v.$ (Zener)
$V_1 = +15v.$ D.C.
$V_2 = -15v.$ D.C.
$V_3 = +4v.$ D.C.
$V_4 = +30v.$ D.C.

Having thus described the invention it is apparent that numerous modifications and departures may be made by those skilled in the art, all of which fall within the scope contemplated by the invention. Consequently the invention herein disclosed is to be construed as limited only by the spirit and scope of the appended claims.

I claim:

1. A voltage monitoring circuit for simultaneously detecting excessive excursions of any one of a plurality of primary voltage sources comprising a bridge circuit network having a first, a second, a third and a fourth junction, said first and second junctions respectively connected to a first and a second primary voltage source, a first and a second transistor each having a base, an emitter and a collector element, the base elements of each of said first and second transistors respectively connected to said third and fourth junctions of said bridge circuit network, a third primary voltage source commonly connected to the junction created by the common connection of the emitter elements of said first and said second transistors a third transistor also having a base, an emitter and a collector element connected via its emitter element to said first transistor circuit, a fourth transistor having a base, an emitter and a collector element connected via its base element to said second transistor, a common output junction created by a connection between the collector elements of said third and fourth transistors and a controlled switching means connected to said common junction to provide an output signal when any one of said first, said second, and said third primary voltage sources exceeds a predetermined allowable excursion and causes the termination of conduction in either said first or said second transistor, to respectively initiate conduction of said third or said fourth transistor, the initiation of conduction in either said third or said fourth transistors causing initiation of conduction in said controlled switching means.

2. The voltage monitoring circuit as set forth in claim 1, wherein said first and said second transistor circuits, each comprise a transistor one of which is a PNP and the other an NPN type, and said transistors are connected together in a complementary manner.

3. The voltage monitoring circuit as set forth in claim 1 wherein said third transistor is connected in a common base arrangement.

4. The voltage monitoring circuit as set forth in claim 1 wherein said controlled switching means is a silicon rectifier.

5. A voltage monitoring circuit for simultaneously detecting excessive excursions of any one of a plurality of primary voltage sources comprising a bridge circuit network having a first, a second, a third and a fourth junction, said first and second junctions connected to a first and a second primary voltage source, a first and a second transistor switching circuit connected to said third and fourth junctions of said bridge circuit, a third primary voltage source commonly connected to said first and second transistor switching circuit, a third and a fourth transistor switching circuit respectively connected to said first and second switching circuits, and a controlled switching output circuit commonly connected to said third and fourth transistor switching circuits, said first and said second switching circuits having appropriate voltage levels connected thereto from said first and second primary voltage source via said bridge network and said third primary voltage source for maintaining each of them in a normally closed condition, said third and said fourth switching circuits and said controlled switching output circuit connected to appropriate voltage levels for maintaining each of them in a normally open condition, wherein magnitude level variations of any one of said first, said second or said third primary voltage sources outside of a predetermined allowable range causes said first or said second normally closed transistor switching circuits to switch to an open condition and subsequently to switch said third or said fourth normally open transistor switching circuits and said controlled switching output circuit to a closed condition.

6. The voltage monitoring circuit as set forth in claim 5 wherein an auxiliary power source is included to supply operating voltage levels to said first, said second, said third and said fourth transistor switching circuits as well as to said controlled switching output circuit.

7. The voltage monitoring circuit as set forth in claim 5 wherein the transistors of said first and said second transistor switching circuits respectively comprise a first and a second transistor, one of which is a PNP type and the other an NPN type, connected together in a complementary fashion, and said third primary power source is connected to the common junction of the emitters of both of said transistors.

8. The voltage monitoring circuit as set forth in claim 5 wherein said bridge network circuit includes a first zener diode serially connected with said first primary voltage source, a second zener diode serially connected with said second primary voltage source and a resistive bridge network connected between said first and said second zener diodes, 9. The voltage monitoring circuit as set forth in claim 8 wherein a PNP and an NPN transistor are respectively connected to opposite arms of said resistive bridge network and said PNP and NPN transistors are connected together in a complementary manner.

10. The voltage monitoring circuit as set forth in claim 8 wherein said first and second zener diodes are connected between a first and a second primary voltage source and a first set of opposite arms of said resistive bridge network, a PNP and an NPN transistor are respectively connected to the second set of opposite arms of said bridge network and said PNP and said NPN transistors are connected together in a complementary manner with their emitters commonly connected together and to a third primary voltage source.